Figure 5:
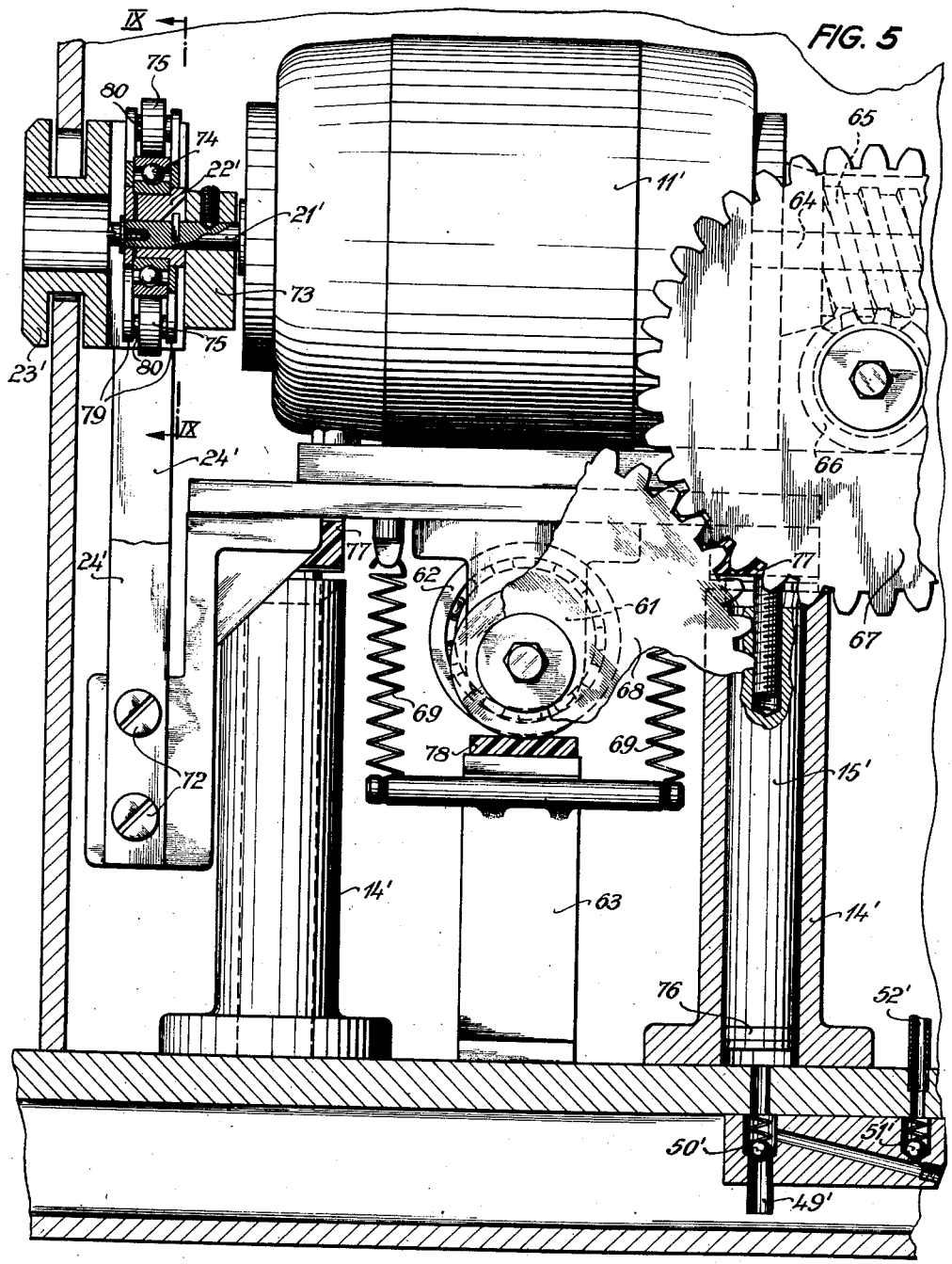

Sept. 17, 1957
H. AMRHEIN ET AL
2,806,329
ABRADING MACHINE
Filed Jan. 28, 1955
5 Sheets-Sheet 1
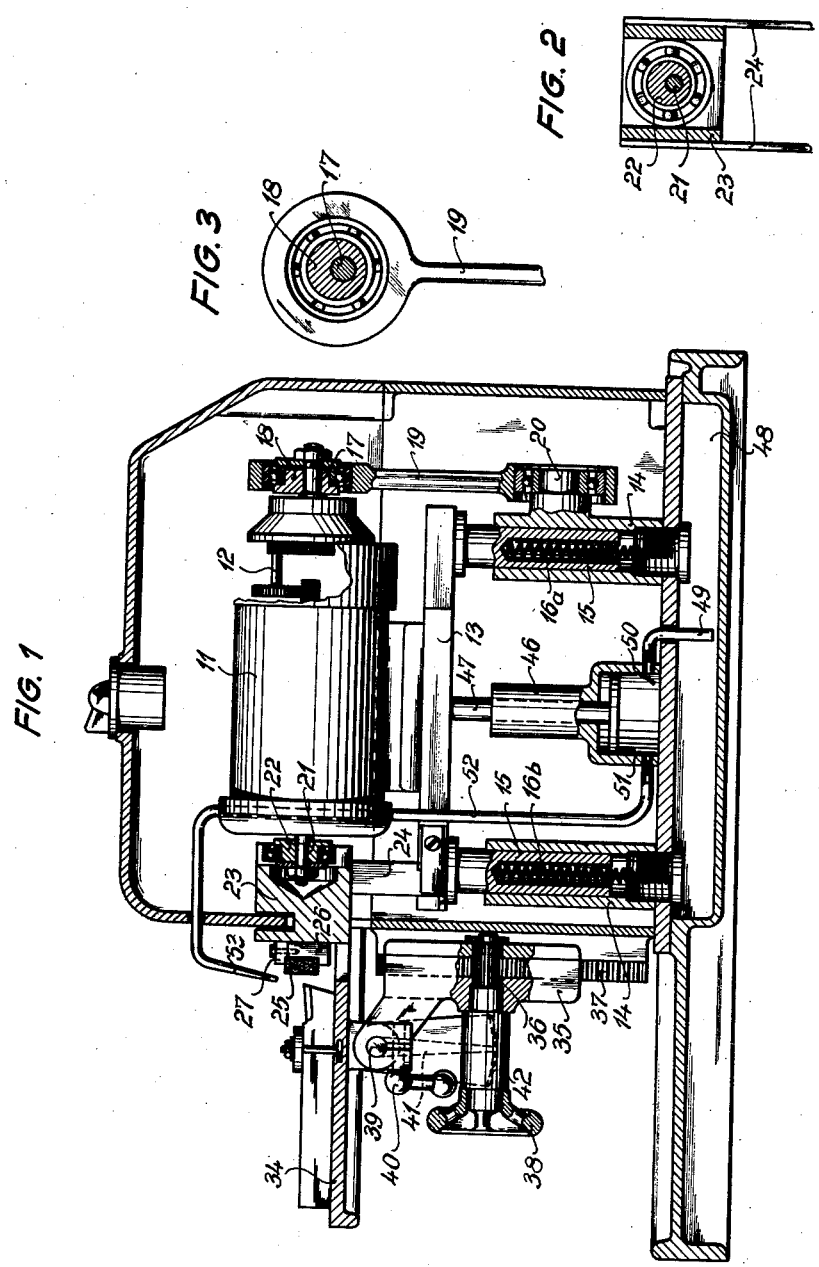
INVENTORS
Heinz AMRHEIN
Emil LANDECK
by
Karl Vinkel
ATTORNEY Sept. 17, 1957    H. AMRHEIN ET AL    2,806,329
ABRADING MACHINE
Filed Jan. 28, 1955    5 Sheets-Sheet 2
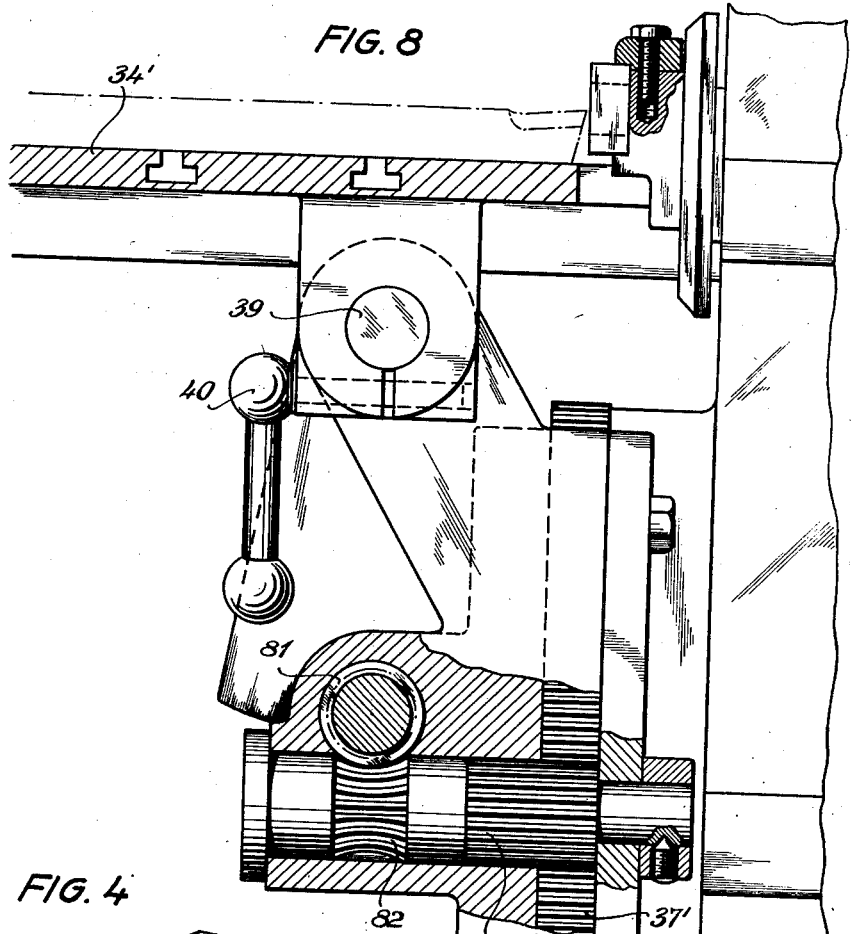
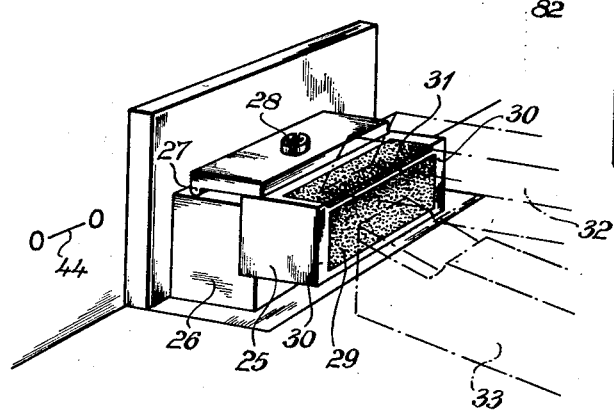
INVENTORS
Heinz AMRHEIN
Emil LANDECK
by
Karl Vinkel
ATTORNEY INVENTORS
Heinz AMRHEIN
Emil LANDECK
by
Karl Vietel
ATTORNEY INVENTORS
Heinz AMRHEIN
Emil LANDECK
by
ATTORNEY Sept. 17, 1957 H. AMRHEIN ET AL 2,806,329
ABRADING MACHINE
Filed Jan. 28, 1955 5 Sheets-Sheet 5
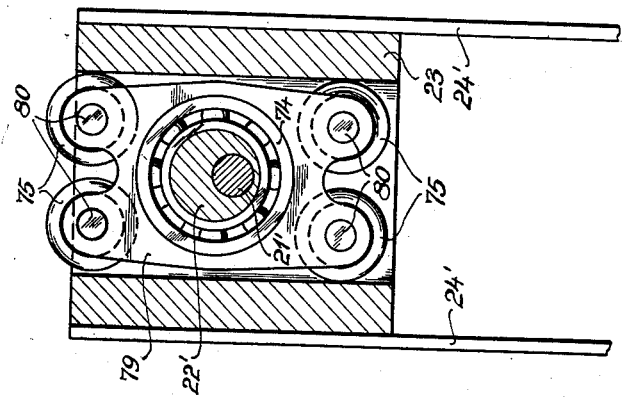
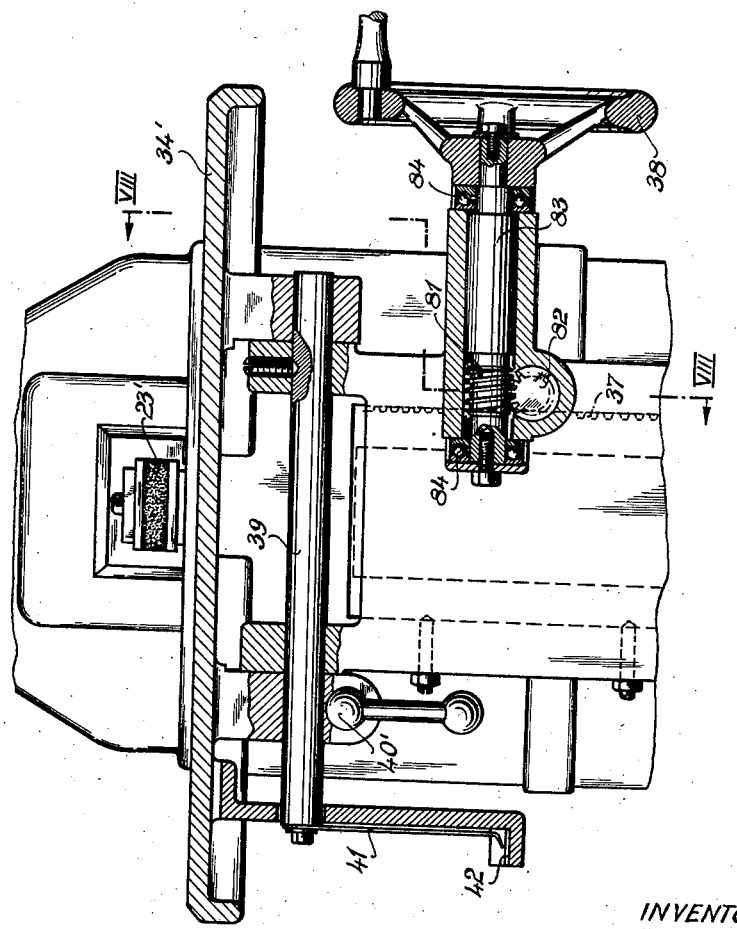
INVENTORS
Heinz AMRHEIN
Emil LANDECK
by
Karl Viertel
ATTORNEY

United States Patent Office 2,806,329
Patented Sept. 17, 1957

2,806,329
ABRADING MACHINE
Heinz Amrhein, Buderich, and Emil Landeck, Solingen, Germany, assignors to Fritz Wendt, Kommanditgesellschaft, Düsseldorf, Germany, a manufacturing company Application January 28, 1955, Serial No. 484,768
8 Claims. (Cl. 51—60)

The invention relates to special purpose grinding abrading machines, redesigned for highly finishing the plane working faces, and more finely sharpening the cutting edges of machine tools, especially of those which are fitted with hard metal bits or cemented carbide tips, and which are to be used for machining under conditions of economy steel castings, aluminium, bronze, hard rubber articles, porcelain, synthetic plastics etc.

The invention aims at strengthening the resistance to wear or staying power of cutting tools of the type described and at reducing the high costs of their production, maintenance and of keeping them in good working order and repair.

In the conventional practice of abrading and finishing cutting tools of the reinforced type set forth, an assortment of rotary abrading discs are mostly used in succession, which are fitted circumferentially with differently graded pulverulent diamond particles.

As a matter of fact, observed by the inventors, cutting edges of tools thus produced sometimes appear to be a saw with irregular serrations, when seen under a large rate of magnification of say about three hundred. This is certainly due to the aforesaid practice, wherein the abrading wheels pass over the working faces and across the cutting edges of the cutting tool with their abrading diamond particles, however small, repeatedly proceeding over the same points and in the same direction.

Another drawback involved in the employment of rotary abrading wheels is, that over-heating of the surfaces of the cutting tool occurs, which leads to cracks therein and results in the edges breaking prematurely away.

Still another disadvantage inherent to the employment of a series of rotary abrading wheels is, that all together they have a very large abrasive surface and, because of the costly diamond settings therein, are rather expensive.

The invention aims at overcoming all the aforesaid drawbacks. In the abrading and finishing machine redesigned according to this invention in contradistinction to prior art grinding machines and to essentially rotational grinding and finishing methods, the cutting tool is fixed on a nonrotating support, so as to uprightly expose the respective plane surface under treatment to a non-rotating abrading tool, which is reciprocated up and down and is simultaneously and very rapidly oscillated in horizontal direction.

Good finishing and resharpening results were obtained by using an abrading tool in the form of a rather small rectangular block, fitted with abrasives at its front and upper side, and being reciprocated and oscillated at frequencies, widely different from each other, namely the horizontal oscillations surpassing at least three times the vertical reciprocations.

Two forms of construction, embodying the invention are illustrated in the accompanying drawings, by way of examples, in which—

Figure 6:
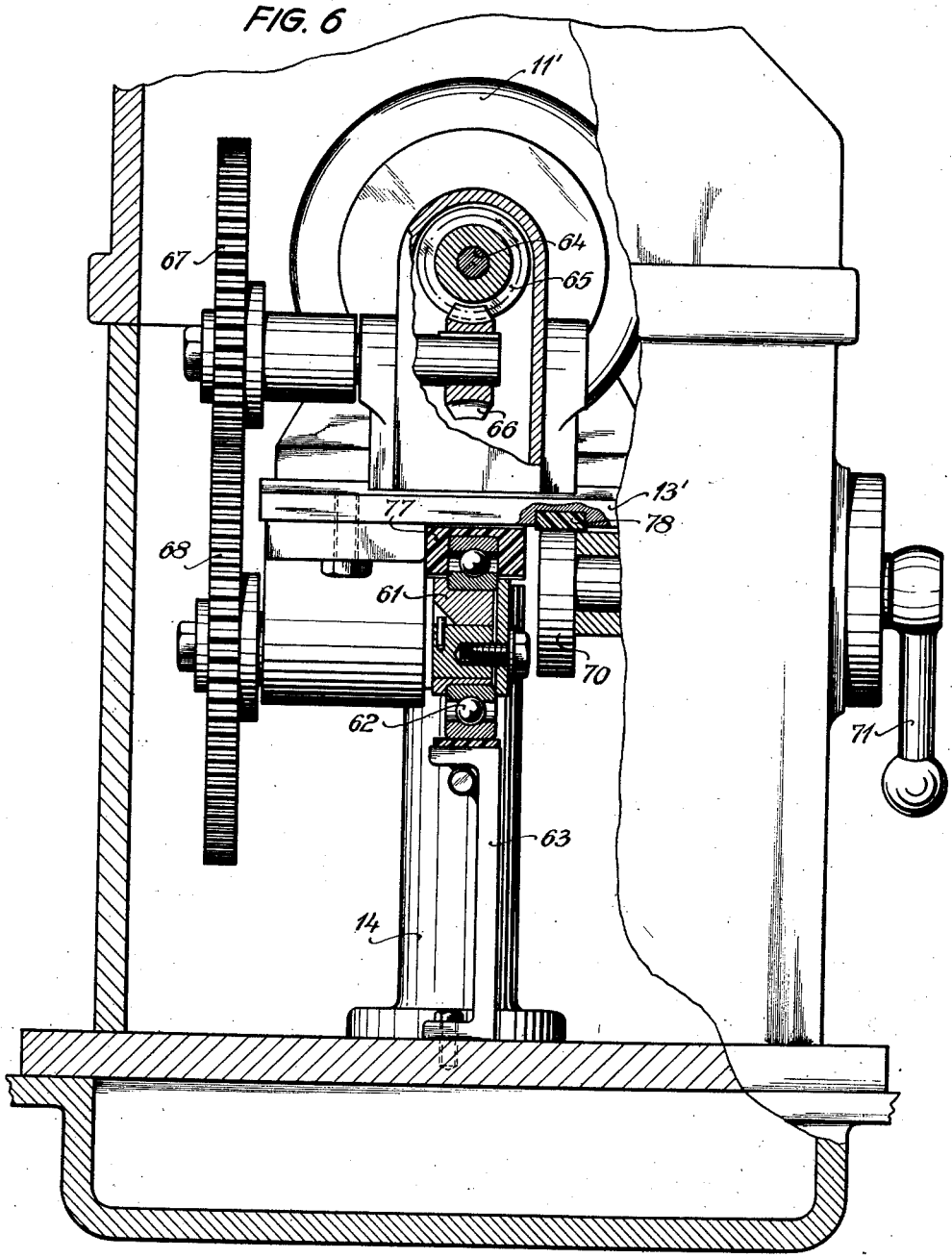

Fig. 1 shows, partly in longitudinal section, the first form of construction of an abrading machine, redesigned according to this invention, Fig. 2 is a section, taken at right angles to the axis of the motor and through an eccentric imparting horizontal oscillating movements to the abrading block, Fig. 3 is a similar section through an eccentric imparting up and down movements to the motor, Fig. 4 shows a means of securing the abrading block on the grinding head, Fig. 5 is a side elevation, partly in section of an abrading machine of modified design, Fig. 6 is a rear elevation, partly in section of the machine shown in Fig. 5, Fig. 7 is a section through the work table and at the same time a front elevation of the grinding head, Fig. 8 is a longitudinal section on line VIII—VIII in Fig. 7, Fig. 9 is a section, taken on line IX—IX in Fig. 5, vertically to the motor axis.

In the construction shown in Fig. 1 the motor 11, wherein a reduction gear 12 is mounted at one side, is arranged on a base plate 13; the base plate 13 rests on two supports each of which consists of a hollow column 14 and a part 15, slidable like a piston in the hollow column.

The parts 15 which are also tubular, accommodate in their bore springs 16a and 16b, which serve for compensating the weight of the motor and of the base plate 13, so that the device hereinafter described, which imparts up and down movements to the motor, does not have to lift the weight of the motor, but only to overcome the forces of inertia.

The driving shaft 17 which may rotate at about 140 revolutions per minute carries an eccentric 18 which is connected by a connecting rod 19 to a pin 20, mounted on a stationary part of the frame; thus the eccentric 18 compels the motor 11 together with its base plate to carry out substantially vertical reciprocating movements at a frequency rate of about 140 cycles per minute.

As the forces exerted by the connecting rod 19 are not directed towards the gravitational center of the moved system, there is a tendency to tip the latter in addition to a sliding displacement. This tipping tendency is however counteracted not only by the parallel guiding action of the parts in the hollow columns 14, but also by the fact, that the springs 16a, which are nearer to the connecting rod 19 have a resiliency factor or spring constant greater than that of the spring 16b more remote from the connecting rod 19.

On the second driving shaft 21, which may rotate at about 2800 revolutions per minute, another eccentric 22 is mounted; this eccentric will impart horizontally directed oscillating motions at a frequency of 2800 cycles per minute to the grinding head, which is guided in horizontal directions by two parallel leaf springs 24; as the springs 24 are fixed on the base plate 13 and participate in its up and down movement, the grinding head carries out up and down reciprocating movements namely, 140 reciprocations per minute, and at the same time horizontally directed oscillating to and fro swinging movements namely at a frequency of about 2800 oscillations per minute.

As shown in Fig. 4 the abrading block 25 is fixed on the front face of the grinding head 23 in such manner, that it can be clamped between a stationary jaw 26 and a movable jaw 27 by tightening a screw 28; another useful feature consists therein, that the abrasive front zone 29 of the block 25 is surrounded on all sides by narrow zones 30 free from abrasives.

An additional zone 31 containing abrasives may be provided on the upper side of the abrading block, which may be used to advantage in the re-sharpening and finishing operation for preliminarily grinding the side rake of the cutting tool in the position shown at 32, in which case the up and down reciprocations of the motor and of the abrading block are cut out and switched off. As indicated above, according to the invention the machine tool is non-rotatably fixed, so as to uprightly expose the respective plane surface under treatment namely in appropriate height and inclination to the abrading tool.

As seen in Figs. 1, 4 and 8, a table 34 is provided to bring the latter accurately into the proper height and inclination to the abrading block 25, so that during the movements of the latter the abrasive zone 29 is fully utilized; the table 34 is vertically adjustable in a guide 35, the adjustment is effected by means of a pinion 36 in mesh with a tooth rack 37, and to be turned by a hand wheel 38.

The angular adjustment of the table 34 is effected by turning the table about the axle 39; the table can be fixed in the desired angle of inclination by a clamping device shown at 40.

For the purpose of accurately setting the table 34 in the desired grinding angle, a hand or pointer 41 is provided, moving over an angle scale 42; a zero mark 44 (Fig. 4) is preferably provided at the side of the abrading block, to indicate, when the middle of it is in the central position, and on which the edge of the work piece to be abraded can be set by suitably adjusting the table 34.

A pump 46 is provided for feeding lubricant to the work, and is actuated according to this invention by the base plate 13, so that the piston 47 of the pump is moved up and down and will suck the lubricant out of a trough 48 through a pipe 49 and valve 50, and force it through the valve 51 into the pipe 52, wherefrom it flows on to the abrading zone 53.

Figs. 5 and 6 show another preferred form of construction of the redesigned abrading machine, which differs from that shown in Fig. 1 in the following respects: For effecting the vertical swinging movement of the motor an eccentric 61 is employed which acts on the carrier 63 through the intermediary of a ball bearing 62. This eccentric is again driven by one of the driving shafts through the intermediary of a gear consisting of a worm 65, a worm wheel 66, a toothed wheel 67 and a pinion 68.

As the eccentric 61 is located below the center of gravity of the motor 11, edging or tilting of the latter cannot occur in this case. As the motor is positively raised and lowered by the eccentric 61, it is advisable in this form of construction to do away with any compensation of weight and to utilize the weight of the motor to insure that the eccentric remains positively connected with the frame during the downward movement of the motor; additional springs 69 may however be provided for insuring the positive contact.

To enable the vertical swinging movement of the motor to be cut out, so that the abrasive block will carry out only horizontal oscillations, as mentioned above, another eccentric 70 is provided, which can be manually operated by a lever 71; with the aid of this eccentric 70 the motor is raised from the carrier part 63.

The grinding head 23' is also in this case guided in horizontal direction by two parallel springs 24', which are secured on the motor frame by screws 72 and participate in the vertical oscillating movement. The movement of the eccentric 22', which is arranged on the high speed driving shaft 21' of the motor and balanced by an eccentric weight 73, is transmitted to the grinding head 23' by a ball bearing 74.

As the one sided stressing of the ball bearing 74 would result in heavy wear therein, it is advisable, in order to uniform or equilibrate the stresses on said ball bearing, to provide additional bearings 75, which as shown in Fig. 9, are rotatable about pins 80 in the housing 79. The ball bearing 74, wherein the eccentric 22' rotates, is arranged in the middle of the housing 79; the ball bearings 75 together with the housing 79 form a carriage which slides up and down between the lateral cheeks of the grinding head 23' and thereby transmits the components of the movements of the eccentric 22' to the grinding head 23'.

A lubricant circulating pump in this form of construction of the machine is accommodated in one of the supports 14', in which the lower end of a piston 15' connected with the motor, is fitted with the aid of a packing 76. The lubricant pump operates in other respects like that illustrated in Fig. 1.

In order to protect the frame against the vibrations, caused by the rapid horizontal oscillation of the grinding head, in spite of counterbalancing, intermediate bearings 77, 77a of oscillation absorbing material such as rubber, synthetic rubber are provided on the supports 14'.

A similar intermediate layer 78, 78a of oscillation absorbing material is fitted under the eccentric 61 on the carrier part 63, and above the eccentric 70 in the base plate 13'.

Details of construction of the work table 34' are shown in Figs. 7 and 8: The vertical adjustment is effected by a tooth rack 37', which is connected with the frame, and on which a pinion 36', connected with the table, rolls; this pinion is driven by hand wheel 38' through the intermediary of a worm 81 and a worm wheel 82; the spindle 83, on which the hand wheel and worm are mounted, runs in ball bearings 84.

Various other structural changes and modifications may be conveniently made in abrading and finishing machines shown and described above, without departing from the spirit and leading ideas of this invention.

What we claim is:

1. In a machine for abrading and finishing cutting tools of the type set forth, the combination with a base plate, of a frame mounted thereon, a work table, adjustably fixed at the front end of that frame, a motor vertically guided in said frame, means actuated by said motor for imparting to the latter an up and down movement in said frame, a grinding head carried by said motor and projecting over said work table, means operated by said motor for imparting horizontal oscillating motions to said grinding head, and a block of abrasive material carried by said grinding head and participating in its horizontal oscillating motions and in the vertical oscillating motions of the motor.

2. Abrading machine, as featured in claim 1, wherein an eccentric is carried on the front end of said motor, for imparting horizontal oscillating motions to said grinding head, and a second eccentric is carried on the rear end of said motor, and a connecting rod between said eccentric and the base plate, imparts a vertical oscillating motion to said motor and the grinding head.

3. Abrading machine, as featured in claim 1, wherein the motor is resiliently supported on the base plate by springs tending to maintain the motor in raised position.

4. Abrading machine, as featured in claim 1, wherein the means for imparting the up and down and horizontal oscillations operate at different speeds, and wherein the up and down oscillations are under the control of a reduction gear in the motor.

5. Abrading machine, as featured in claim 1, wherein means are provided for cutting out the up and down movement of the motor.

6. Abrading machine, as featured in claim 1, wherein means are provided for cutting out the up and down movement of the motor, comprising an eccentric, mounted in the machine frame under said motor, and a hand lever connected to said eccentric, to raise and maintain the motor in raised position.

7. Abrading machine, as featured in claim 1, wherein the block of abrasive material is provided with working surfaces at its front and upper side.

8. Abrading machine, as featured in claim 1, wherein the block of abrasive material is enclosed in a frame of non-abrasive material, leaving an abrasive core exposed at the front surface of the block.

References Cited in the file of this patent

UNITED STATES PATENTS

| | | |
|---|---|---|
| 445,349 | Bausch | Jan. 27, 1891 |
| 2,195,065 | Wallace | Mar. 26, 1940 |
| 2,284,056 | Indge | May 26, 1942 |